United States Patent
Lin et al.

(10) Patent No.: US 9,622,062 B1
(45) Date of Patent: Apr. 11, 2017

(54) NAVIGATING DEVICE AND VEHICLE

(71) Applicant: Leauto Intelligent Technology (BEIJING) Co. Ltd., Beijing (CN)

(72) Inventors: Wei Lin, Beijing (CN); Yu Zou, Beijing (CN); Yong Xu, Beijing (CN); WenRui Li, Beijing (CN); KunSheng Chen, Beijing (CN); Dan Li, Beijing (CN); Peng Liu, Beijing (CN); XiaoFei Gou, Beijing (CN)

(73) Assignee: Leauto Intelligent Technology (Beijing) Co. Ltd., Beijing (CN)

( * ) Notice: Subject to any disclaimer, the term of this patent is extended or adjusted under 35 U.S.C. 154(b) by 0 days.

(21) Appl. No.: 14/978,791

(22) Filed: Dec. 22, 2015

(30) Foreign Application Priority Data

Oct. 30, 2015 (CN) .......................... 2015 1 0729577

(51) Int. Cl.
| | |
|---|---|
| *H04W 4/22* | (2009.01) |
| *H04B 1/38* | (2015.01) |
| *G01C 21/36* | (2006.01) |
| *H04W 4/06* | (2009.01) |
| *H04W 4/04* | (2009.01) |
| *H04W 4/00* | (2009.01) |
| *H04B 1/3822* | (2015.01) |

(52) U.S. Cl.
CPC .......... *H04W 4/22* (2013.01); *G01C 21/3667* (2013.01); *H04B 1/3822* (2013.01); *H04W 4/008* (2013.01); *H04W 4/046* (2013.01); *H04W 4/06* (2013.01)

(58) Field of Classification Search
CPC ......... H04W 4/22; H04W 4/06; H04W 4/046; H04W 4/008; H04B 1/3822; G01C 21/3667
See application file for complete search history.

(56) References Cited

U.S. PATENT DOCUMENTS

| | | | | |
|---|---|---|---|---|
| 2004/0148090 | A1* | 7/2004 | Melen ................... | G01C 21/26 701/482 |
| 2009/0170568 | A1* | 7/2009 | Karino ................. | H04M 1/6075 455/569.2 |
| 2010/0030459 | A1* | 2/2010 | Geelen ................. | G01C 21/32 701/532 |
| 2013/0321465 | A1* | 12/2013 | Takeuchi ........... | G01C 21/3682 345/634 |
| 2014/0302810 | A1* | 10/2014 | Inha ...................... | H04W 4/005 455/404.1 |

* cited by examiner

*Primary Examiner* — Brandon Miller
(74) *Attorney, Agent, or Firm* — Hauptman Ham, LLP

(57) ABSTRACT

A navigating device and a vehicle are disclosed. A V2X communication circuit electrically connected with the navigating unit may be additionally provided in the navigating device; thereby a communication connection with nearby vehicles may be established via V2X communication. Since V2X is a kind of short-range communication, it is possible to perform interactions with nearby vehicle by establishing communication connection with nearby vehicles via V2X communication, and may address the technical problems that the navigating device in the related art have unitary functions and thus cannot perform interaction with nearby vehicles.

10 Claims, 2 Drawing Sheets

NAVIGATING DEVICE AND VEHICLE

CROSS-REFERENCE TO RELATED APPLICATIONS

This application is based on and claims priority to Chinese Patent Application No. 201510729577.0, with the title of "NAVIGATING DEVICE AND VEHICLE", filed on Oct. 30, 2015, the full disclosure of which is hereby incorporated by reference in its entirety.

TECHNICAL FIELD

The present disclosure relates to electronic technologies, and more particularly to a navigating device and vehicle.

BACKGROUND

Navigating device is a kind of electronic device having the functions of displaying map, locating and planning route, which may be often mounted inside the vehicle. When the user determines a destination and locates itself in the map during driving, the navigating device may plan at least one route to the destination for the user's reference.

During the driving of vehicles, the user may not only have a need for navigating, but also need to perform interaction with nearby vehicles. However, in the related art, the navigating device may have unitary functions and may be not able to achieve the function of performing interaction with nearby vehicles.

SUMMARY

The embodiments of the present disclosure provide a navigating device and vehicle, which may address the technical problems of unitary functions of the navigating device in the related art.

In the first aspect, there is provided a navigating device including: an V2X (Vehicle to X) communication circuit configured to establish communication connection with nearby vehicles via V2X communication, and receive a position of a first vehicle broadcast by the first vehicle among nearby vehicles via V2X communication through such communication connection; a navigating unit electrically connected with the V2X communication circuit and a positioning unit and configured to display an icon of the first vehicle in a map according to the position of the first vehicle.

Optionally, the navigating device as described above may further include: a positioning unit configured to locate a position of a second vehicle with the navigating device mounted thereon, the navigating unit may be electrically connected with the positioning unit and configured to display an icon of the second vehicle in the map according to the position of the second vehicle; the V2X communication may be further configured to obtain the position of the second vehicle by the navigating unit and broadcast the position of the second vehicle via V2X communication.

Optionally, the navigating device as described above may further include: a voice inputting device and a voice outputting device, the voice inputting device and the voice outputting device may be electrically connected with the V2X communication circuit through the navigating unit, respectively, the voice inputting device may be configured to input voice, and transmit the input voice to the V2X communication circuit through the navigating unit; the voice outputting device may be configured to receive the voice from the V2X communication circuit through the navigating unit and output the received voice.

The navigating device may be further configured to determine the first vehicle corresponding to the icon of the first vehicle selected by the user in the map.

The V2X communication circuit may be further configured to establish a voice communication with the first vehicle via V2X communication.

Optionally, the navigating device as described above may further include: a touch display electrically connected with the V2X communication through the navigating unit and configured to perform inputting by touching and transmit the information input by touching to the V2X communication circuit through the navigating device unit, and receive the information from the V2X communication circuit through the navigating unit and display the information.

Optionally, in the navigating device as described above, the navigating unit may be further configured to generate a rescuing request, which may include a position of the second vehicle with the navigating device mounted thereon, and rescuing information; the V2X communication circuit may be further configured to broadcast the rescuing request and receive a rescuing response transmitted by the first vehicle via V2X communication, the touch display may be further configured to acquire the rescuing information input by the user on the interface displaying the map, removing the icons of each vehicle displayed in the map if the V2X communication circuit receives a rescuing response transmitted by the first vehicle, and display the icon of the first vehicle in the map according to the position of the first vehicle, and display the icon of the second vehicle in the map according to the position of the second vehicle.

Optionally, the navigating device as described above may further include: a power supply configured to supply power to the navigating unit, the positioning unit, the V2X communication circuit and the touch display.

In the second aspect, there is provided a vehicle including the navigating device as described above.

According to the navigating device and vehicle, a V2X communication circuit electrically connected with the navigating unit may be additionally provided in the navigating device, thereby a communication connection with nearby vehicles may be established via V2X communication. Since V2X is a kind of short-range communication, it is possible to perform interactions with nearby vehicle by establishing communication connection with nearby vehicles via V2X communication, and may address the technical problems that the navigating device in the related art may have unitary functions and thus cannot perform interaction with nearby vehicles.

DETAILED DESCRIPTION

Detailed description is given below for the method, device, and navigating device for displaying positions of vehicles provided by the embodiments of the present disclosure in connection with the drawings.

First Embodiment

Figure 1:
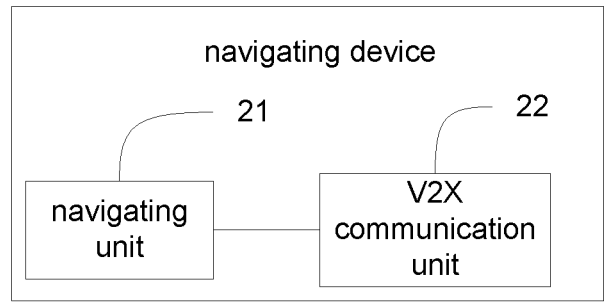
FIG. 1 is a structural view of a navigating device provided by the first embodiment of the present disclosure.

FIG. 1 is a structural view of a navigating device provided by the first embodiment of the present disclosure. As shown in FIG. 1, the device may include: a navigating unit 22 and a V2X communication circuit 23. The V2X communication circuit 23 may be electrically with the navigating unit 22 and configured to establish communication connection with nearby vehicles via V2X communication. The V2X communication circuit 23 may be further configured to receive a position of a first vehicle broadcast by the first vehicle among nearby vehicles via V2X communication through such communication connection. The navigating unit 22 may be electrically connected with the V2X communication circuit 23 and configured to display an icon of the first vehicle in a map according to the position of the first vehicle.

Since V2X is a kind of short-range communication, it is possible to perform interactions with nearby vehicle by establishing communication connection with nearby vehicles via V2X communication, and may address the technical problems that the navigating device in the related art may have unitary functions and thus cannot perform interaction with nearby vehicles.

Figure 2:
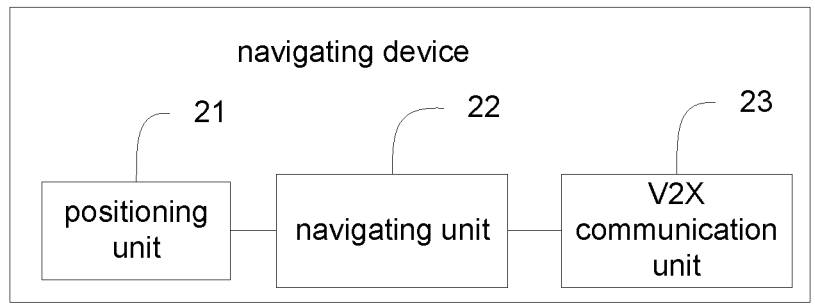
FIG. 2 is a structural view of another navigating device provided by the first embodiment of the present disclosure.

Furthermore, the first embodiment may provide another navigating device. FIG. 2 is a structural view of another navigating device provided by the first embodiment of the present disclosure. As shown in FIG. 2, the navigating device may further include: a positioning unit 21. The positioning unit 21 may be configured to acquire the position of the second vehicle with the navigating device mounted thereon.

The navigating unit 22 may be electrically connected with the positioning unit 21 and configured to display an icon of the second vehicle in the map according to the position of the second vehicle.

The V2X communication circuit 23 may be further configured to acquire the position of the second vehicle by means of the navigating unit 22 and broadcast the position of the second vehicle via V2X communication.

As a possible application scenario, the navigating device may enable the user to acknowledge the relative position relationship between nearby vehicles and the second vehicle with the navigating device mounted thereon driven by the user, thereby the safety in driving may be improved.

More particularly, the V2X communication circuit 23 may receive the position of the first vehicle broadcast by the first vehicle via V2X communication through the communication connection, i.e., receive the position of vehicles broadcast by nearby vehicles via V2X communication. The positioning unit 21 may acquire the position of the second vehicle with the navigating device mounted thereon and the V2X communication circuit 23 may broadcast the position of the second vehicle with the navigating device mounted thereon via V2X communication, i.e., display the icon of the vehicle at the position this vehicle in the map, and display the icon of the second vehicle in the map according to the position of the second vehicle.

In such application scenario, the navigating device may receive the positions of the vehicles broadcast by nearby vehicles via V2X communication and display icons of vehicles at corresponding positions of vehicles in the map, thereby the driver may acknowledge the positions of nearby vehicles by visual observation. Since V2X is a kind of short-range communication, the positions of vehicles received via V2X communication may be the positions of nearby vehicles, so that the driver may be able to acknowledge the positions of nearby vehicles through the icons of vehicles displayed in the map even in a region with narrow visual field and thus the safety in driving may be improved.

In the present embodiment, it is possible to establish the communication connection with nearby vehicles via V2X communication by additionally providing a V2X communication circuit electrically connected with the navigating unit in the navigating device. Since V2X is a kind of short-range communication, it is possible to perform interactions with nearby vehicle by establishing communication connection with nearby vehicles via V2X communication, and may address the technical problems that the navigating device in the related art may have unitary functions and thus cannot perform interaction with nearby vehicles. Furthermore, the navigating device may receive the positions of the vehicles broadcast by nearby vehicles via V2X communication and display icons of vehicles at corresponding positions of vehicles in the map, thereby the driver may acknowledge the positions of nearby vehicles by visual observation and thus the safety in driving may be improved.

Second Embodiment

Figure 3:
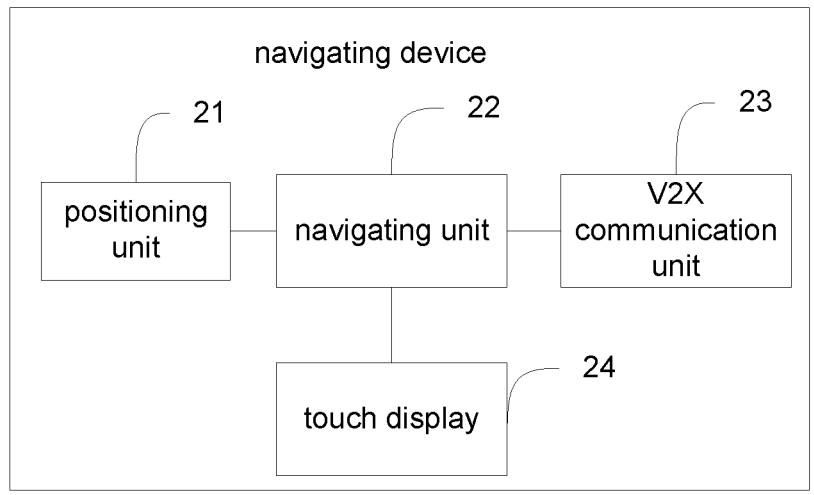
FIG. 3 is a structural view of another navigating device provided by the second embodiment of the present disclosure.

FIG. 3 is a structural view of another navigating device provided by the second embodiment of the present disclosure. As shown in FIG. 3, based on the another navigating device provided by the first embodiment, the navigating device may further include: a touch display 24.

The touch display 24 may be electrically connected with the V2X communication circuit 23 through the navigating unit 22 and used for touch input and configured to transmit the information input by touching to the V2X communication circuit 23 through the navigating unit 22, and receive the information from the V2X communication circuit 23 through the navigating unit 22 and display the same.

As a possible application scenario, the touch display 24 may display icons of each vehicle in the map according the positions of each vehicle. When the touch display 24 acquires a rescuing information input on an interface displaying a map by a user, the navigating unit 22 may generate a rescuing request carrying the rescuing information therewith and then the V2X communication circuit 23 may broadcast the rescuing request via V2X communication and when the V2X communication circuit 23 receives a rescuing response, the touch display 24 may display the position of the rescuing vehicle in the map, which may not only enable nearby vehicles to provide rescue in time, but also improve the efficiency in rescuing, and meanwhile the vehicle to be rescued may acknowledge the position of the rescuing vehicles. The rescuing information may include one or more of model of vehicle, plate number, name of owner of the vehicle, description on fault, reward, and emergency level of rescuing action, and combinations thereof. For example, the rescuing information may include the number of people to be rescued, fault of vehicle to be rescued, health conditions of people to be rescued, supplies demands, personnel demands, technique demands, service demands, rescuing level, notes, and the like. More particularly, the more emergent the rescuing situation is, the higher the rescuing level is.

In the present embodiment, it is possible to establish the communication connection with nearby vehicles via V2X communication by additionally providing a V2X communication circuit electrically connected with the navigating unit in the navigating device. Since V2X is a kind of short-range communication, it is possible to perform interactions with nearby vehicle by establishing communication connection with nearby vehicles via V2X communication, and may address the technical problems that the navigating device in the related art may have unitary functions and thus cannot perform interaction with nearby vehicles. Furthermore, the present embodiment may generate a rescuing request carrying the rescuing information therewith, when a rescuing information input on an interface displaying a map by a user is acquired, and then the rescuing request may be broadcast via V2X communication and when a rescuing response is received, the position of the rescuing vehicle may be displayed in the map, which may not only enable nearby vehicles to provide rescue in time, but also improve the efficiency in rescuing, and meanwhile the vehicle to be rescued may acknowledge the position of the rescuing vehicles.

Third Embodiment

Figure 4:
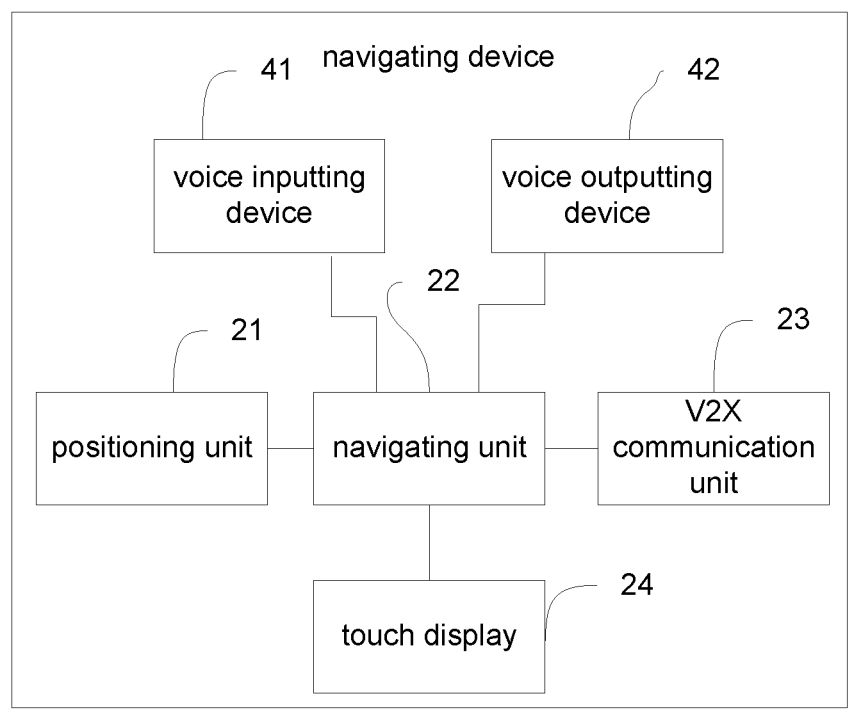
FIG. 4 is a structural view of still another navigating device provided by the third embodiment of the present disclosure.

FIG. 4 is a structural view of still another navigating device provided by the third embodiment of the present disclosure. As shown in FIG. 4, based on the second embodiment, the navigating device may further include: a voice inputting device 41, a voice outputting device 42, and a power supply.

The voice inputting device 41 and the voice outputting device 42 may be electrically connected with the V2X communication circuit 23 through the navigating unit 22, respectively. The voice inputting device 41 may be configured to input voice, and transmit the input voice to the V2X communication circuit 23 through the navigating unit 22. The voice outputting device 42 may be configured to receive the voice from the V2X communication circuit 23 through the navigating unit 22 and output the received voice.

As a possible application scenario, when the touch display 24 display icons of each vehicle in the map according the positions of each vehicles, the vehicle corresponding to the icons of the vehicles selected by the user in the map may be determined, and the V2X communication circuit 23 may establish a voice communication with the first vehicle via V2X communication. More particularly, the V2X communication circuit 23 may transmit a voice communication request to the vehicle via V2X communication; the communication connection with the vehicle may be established when the V2X communication circuit 23 receives the response for voice communication transmitted by the vehicle. Furthermore, in the communication connection, it is possible to implement the voice communication with nearby vehicles by collecting voices of the user with the voice inputting device 41 and outputting received voices with the voice outputting device 42.

In such application scenario, it is possible to enable the user to make voice communication by selecting the icon of the first vehicle displayed in the map, which is convenient and without acknowledging the phone number or social account of the other party. Furthermore, it is also possible to perform a various kinds of voice communication such as three-party or multi-party communication and broadcasting and the like, and thus the flexibility of voice communication may be improved and the functions of the on-vehicle device may be enriched.

It should be noted that the voice inputting device 41 may be a microphone, and the voice outputting device 42 may be a speaker.

Furthermore, the navigating device may include a power supply. The power supply may be electrically connected with the navigating unit 21, the positioning unit 22, the V2X communication circuit 23, and the touch display 24 so as to supply power.

In the present embodiment, it is possible to establish the communication connection with nearby vehicles via V2X communication by additionally providing a V2X communication circuit electrically connected with the navigating unit in the navigating device. Since V2X is a kind of short-range communication, it is possible to perform interactions with nearby vehicle by establishing communication connection with nearby vehicles via V2X communication, and may address the technical problems that the navigating device in the related art may have unitary functions and thus cannot perform interaction with nearby vehicles. Furthermore, it is possible to enable the user to make voice communication by selecting the icon of the first vehicle displayed in the map, which is convenient and without acknowledging the phone number or social account of the other party by displaying icons of each vehicles in a map according to positions of each vehicles, then determining a first vehicle corresponding to an icon of the first vehicle selected by the user in the map, and establishing a voice communication with the first vehicle based on V2X communication.

Fourth Embodiment

The embodiment of the present disclosure may provide a vehicle including the navigating device provided by the foregoing embodiments.

More particularly, the navigating device in the vehicle may establish the communication connection with nearby vehicles via V2X communication by additionally providing a V2X communication circuit electrically connected with the navigating unit. Since V2X is a kind of short-range communication, it is possible to perform interactions with nearby vehicle by establishing communication connection with nearby vehicles via V2X communication, and may address the technical problems that the navigating device in the related art may have unitary functions and thus cannot perform interaction with nearby vehicles.

Furthermore, navigating device in the vehicle may include a touch display, and the navigating device may generate a rescuing request carrying the rescuing information therewith, when the touch display acquires a rescuing information input on an interface displaying a map by a user, and then the rescuing request may be broadcast via V2X communication and when a rescuing response is received, the position of the rescuing vehicle may be displayed in the map, which may not only enable nearby vehicles to provide rescue in time, but also improve the efficiency in rescuing, and meanwhile the vehicle to be rescued may acknowledge the position of the rescuing vehicles.

The navigating device in the vehicle may further include a voice inputting device and a voice outputting device. Therefore, the navigating device may enable the user to make voice communication by selecting the icon of the first vehicle displayed in the map, which is convenient and without acknowledging the phone number or social account of the other party by displaying icons of each vehicles in a map according to positions of each vehicles by the touch display, then determining a first vehicle corresponding to an icon of the first vehicle selected by the user in the map, and establishing a voice communication with the first vehicle based on V2X communication.

In the present embodiment, it may be possible to establish the communication connection with nearby vehicles via V2X communication by additionally providing a V2X communication circuit electrically connected with the navigating unit in the navigating device. Since V2X is a kind of short-range communication, it is possible to perform interactions with nearby vehicle by establishing communication connection with nearby vehicles via V2X communication, and may address the technical problems that the navigating device in the related art may have unitary functions and thus cannot perform interaction with nearby vehicles.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

What is claimed is:

1. A navigating device, comprising:
    an V2X (Vehicle to X) communication circuit configured to establish a communication connection with nearby vehicles via V2X communication, and receive a position of a first vehicle broadcast by the first vehicle among nearby vehicles via the V2X communication through such communication connection;
    a navigating unit electrically connected with the V2X communication circuit and configured to display an icon of the first vehicle in a map according to the position of the first vehicle; and
    a voice inputting device and a voice outputting device, wherein
    the voice inputting device and the voice outputting device are electrically connected with the V2X communication circuit via the navigating unit, respectively,
    the voice inputting device is configured to input voice, and transmit the input voice to the V2X communication circuit through the navigating unit,
    the voice outputting device is configured to receive the voice from the V2X communication circuit through the navigating unit and output the received voice,
    the navigating device is further configured to determine the first vehicle corresponding to the icon of the first vehicle selected by the user in the map, and
    the V2X communication circuit is further configured to establish a voice communication with the first vehicle via the V2X communication.

2. The navigating device according to claim 1, further comprising:
    a positioning unit configured to positioning a second vehicle with the navigating device mounted thereon;
    wherein the navigating unit is electrically connected with the positioning unit and configured to display an icon of the second vehicle in the map according to the position of the second vehicle; and
    the V2X communication circuit is further configured to obtain the position of the second vehicle via the navigating unit and broadcast the position of the second vehicle via the V2X communication.

3. A vehicle, comprising the navigating device according to claim 2.

4. The navigating device according to claim 1, further comprising:
    a touch display electrically connected with the V2X communication through the navigating unit and configured to perform an inputting by touching and transmit information input by touching to the V2X communication circuit through the navigating device unit, and receive the information from the V2X communication circuit through the navigating unit and display the information.

5. The navigating device according to claim 4, wherein
    the navigating unit is further configured to generate a rescuing request, the rescuing request comprising a position of the second vehicle with the navigating device mounted thereon, and rescuing information;
    the V2X communication circuit is further configured to broadcast the rescuing request via V2X communication, and receive a rescuing response transmitted by the first vehicle, and
    the touch display is further configured to acquire the rescuing information input by the user on the interface displaying the map, removing the icon of each vehicle displayed in the map when the V2X communication circuit receives a rescuing response transmitted by the first vehicle, and display the icon of the first vehicle in the map according to the position of the first vehicle, and display the icon of the second vehicle in the map according to the position of the second vehicle.

6. A vehicle, comprising the navigating device according to claim 5.

7. The navigating device according to claim 4, further comprising:
    a power supply configured to supply power to the navigating unit, the positioning unit, the V2X communication circuit and the touch display.

8. A vehicle, comprising the navigating device according to claim 7.

9. A vehicle, comprising the navigating device according to claim 4.

10. A vehicle, comprising the navigating device according to claim 1.

* * * * *